G. L. REUSCHLINE.
APPARATUS FOR HARVESTING ICE.
APPLICATION FILED JULY 8, 1916.

1,274,079.

Patented July 30, 1918.
3 SHEETS—SHEET 1.

Inventor
George L. Reuschline
By Cornelius D. Ehret
his Attorney

G. L. REUSCHLINE.
APPARATUS FOR HARVESTING ICE.
APPLICATION FILED JULY 8, 1916.
1,274,079.
Patented July 30, 1918.
3 SHEETS—SHEET 2.
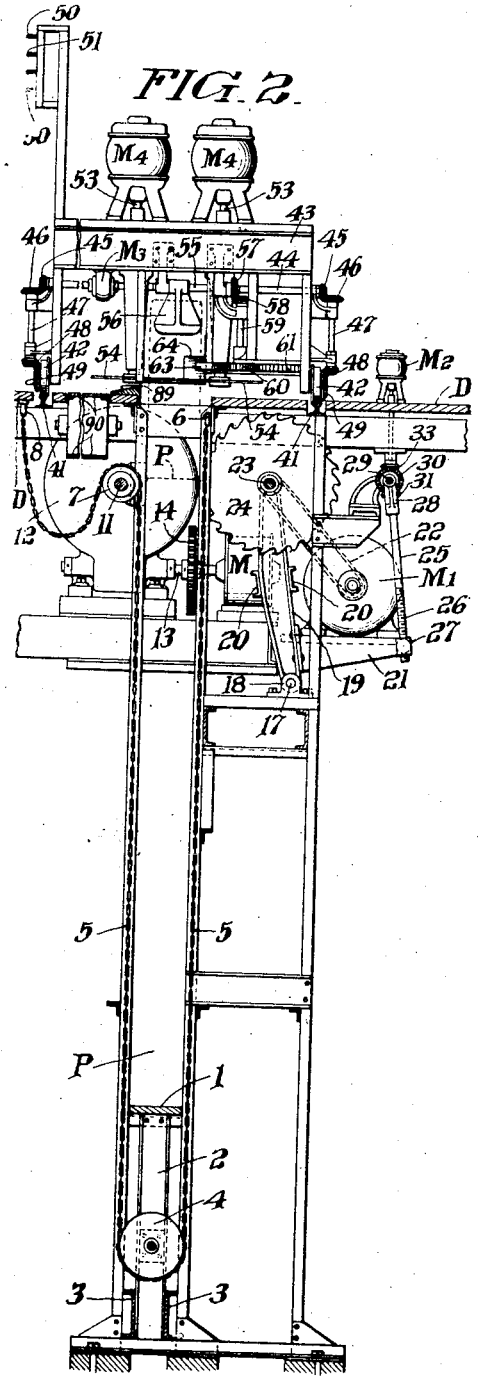
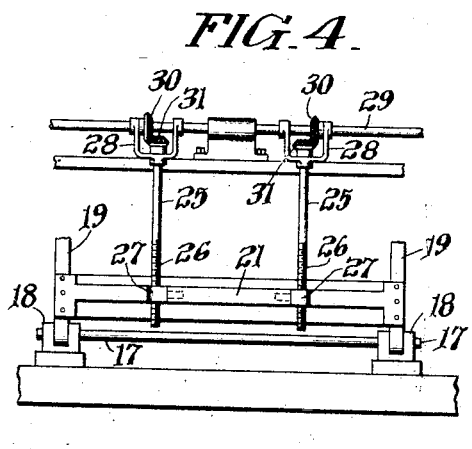
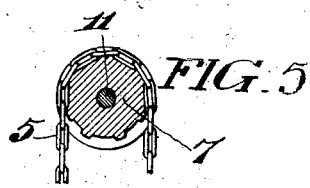
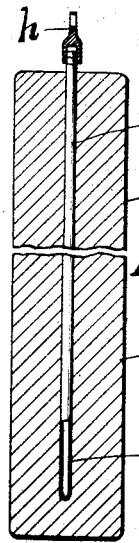
Inventor
George L. Reuschline
By Cornelius D. Ehret
his Attorney G. L. REUSCHLINE.
APPARATUS FOR HARVESTING ICE.
APPLICATION FILED JULY 8, 1916.
1,274,079.
Patented July 30, 1918.
3 SHEETS—SHEET 3.
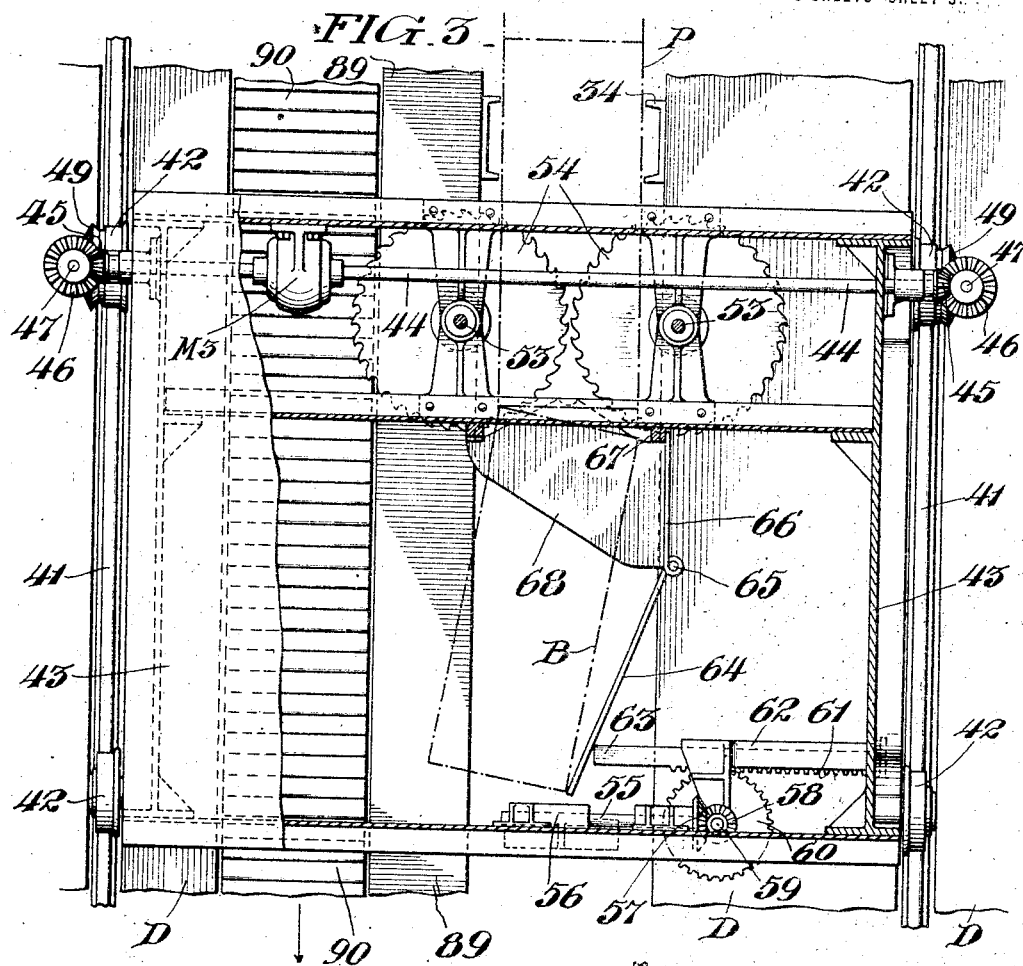
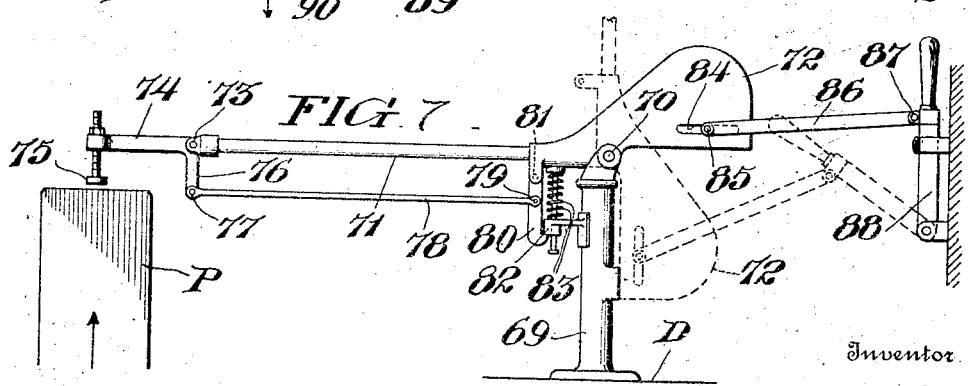
Inventor
George L. Reuschline
By Cornelius D. Ehret
His Attorney

UNITED STATES PATENT OFFICE.

GEORGE L. REUSCHLINE, OF PHILADELPHIA, PENNSYLVANIA, ASSIGNOR TO AMERICAN ICE COMPANY, A CORPORATION OF NEW JERSEY.

APPARATUS FOR HARVESTING ICE.

1,274,079.  Specification of Letters Patent.  Patented July 30, 1918.

Application filed July 8, 1916. Serial No. 108,180.

*To all whom it may concern:*

Be it known that I, GEORGE L. REUSCHLINE, a citizen of the United States, residing in Philadelphia, county of Philadelphia, and State of Pennsylvania, have invented new and useful Improvements in Apparatus for Harvesting Ice, of which the following is a specification.

My invention relates to apparatus for harvesting ice, particularly artificial ice.

It is the object of my invention to provide apparatus for cutting plate ice while in the vertical position into a plurality of blocks.

To these ends I provide apparatus, of the character hereinafter described, for sawing the plate of ice vertically and horizontally, the vertical sawing preferably being intermittent and alternating with horizontal cuts.

My invention comprises a power or motor driven carriage carrying horizontal saws for making the horizontal cuts; it comprises also vertical saws which with their driving motor may be swung into and out of position for vertically sawing the plate; it comprises further power actuated means for tilting the aforementioned motor and vertical saws; it comprises further independent motor driven means for elevating the plate of ice; it comprises further means for automatically displacing a severed block of ice, preferably to a conveyer which carries it away; it comprises other features hereinafter described and combinations of various features.

For an illustration of one of the forms of apparatus embodying my invention reference may be had to the accompanying drawings, in which:

Fig. 2 is an end elevational view of the apparatus shown in Fig. 1, Fig. 2 being partly in section taken on the line 2—2 of Fig. 1.

Fig. 3 is a plan view, on enlarged scale, and partly in horizontal section, of parts of the apparatus illustrated in Figs. 1 and 2.

Fig. 4 is a fragmentary side elevational view of mechanism for actuating the vertical saws and driving motor.

Fig. 5 is a cross sectional view through a chain wheel constituting part of the ice plate elevating mechanism.

Fig. 6 is a sectional view through an ice plate showing means frozen therein for raising the same.

Fig. 7 is an elevational view of gaging and switching mechanism for controlling limitation of elevation of the ice plate.

Figure 1:
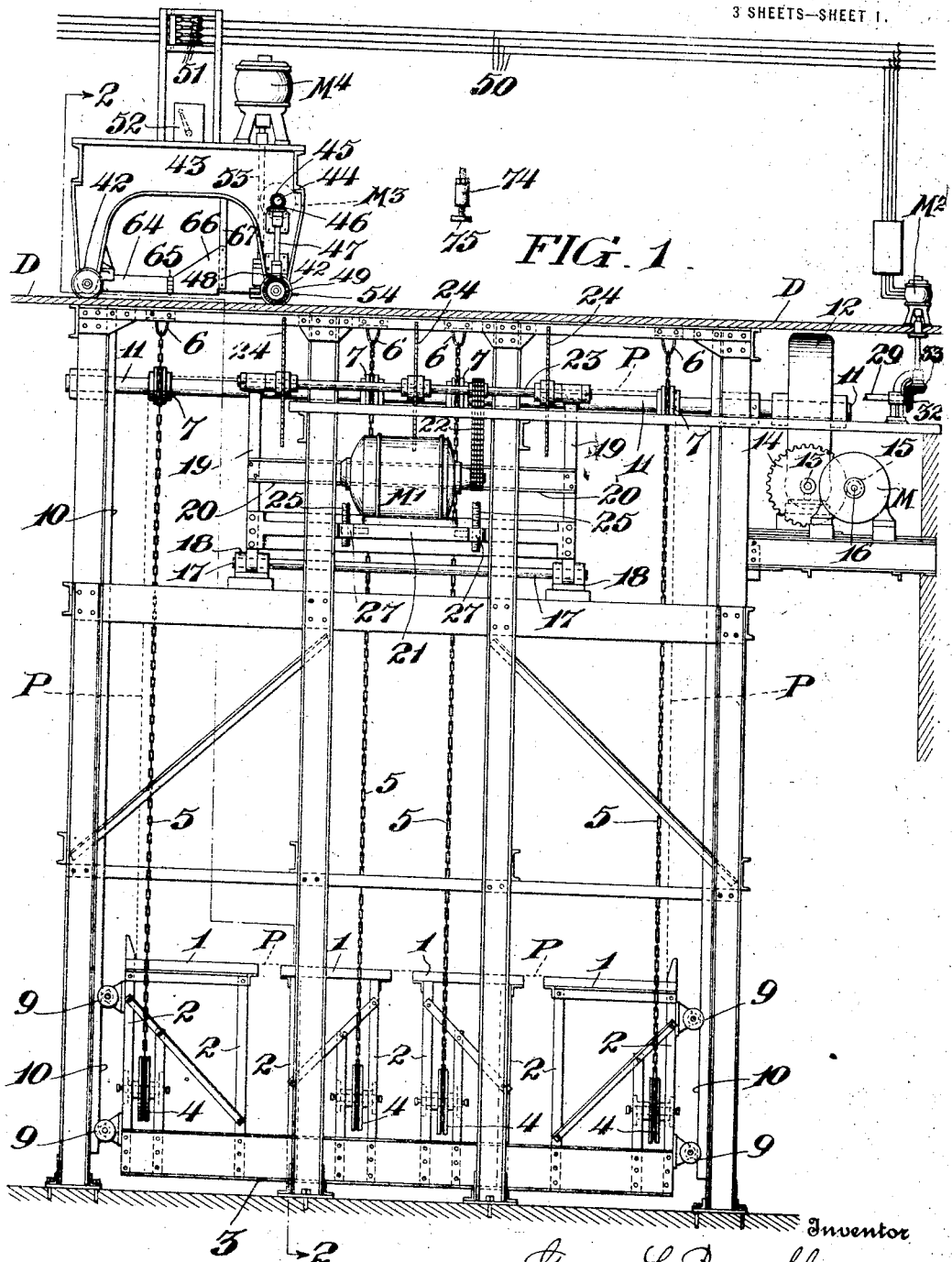
Figure 1 is a side elevational view, partly in section, of the ice harvesting apparatus.

The water to be frozen into ice may be contained in a compartment which is relatively narrow, and deep and broad. The water is cooled and eventually frozen by well known refrigerating methods resulting in a plate of ice, a section of which is indicated at P, Fig. 6. Frozen in the plate is a plurality of tubes or pipes $p$, generally closed at their lower ends, and each provided at the upper end with an eye or hook $h$ by which a traveling crane may raise the plate P from the cell or compartment in which it is formed vertically upward clear of its cell or compartment and then carried to the apparatus about to be described.

The plate P, indicated in dotted lines, Fig. 1, is then lowered by the crane to the position indicated in Fig. 1 until it rests upon the false bottoms 1, which latter are spaced from each other to permit passage past the vertical saws hereinafter referred to.

When the plate has been so placed in the apparatus the hooks or eye members $h$ are removed from the pipes $p$ and hot water or other heating medium introduced into the latter to thaw them loose from the plate P, whereupon they are withdrawn upwardly and removed.

The plate P then finds itself continuing in a vertical position such as it occupied during the freezing operation.

The false bottoms 1 are supported by vertical members 2 upon the horizontal beam 3 upon which are supported also the chain or sprocket wheels 4 over each of which passes a chain 5, one end of which is connected at 6 to the deck or floor D and the other end of which passes over the chain driving sprocket wheel 7 and then attached at 8, Fig. 2, to the deck or floor D. The frame or framework upon which the plate P rests as described is provided at its sides with guide rollers 9, Fig. 1, which roll upon or engage the lateral vertically extending guides 10.

The chain driving wheels 7, one of which is shown in section, Fig. 5, are secured upon and driven by the shaft 11 which is in turn driven by a gear housed within the casing 12, said gear being in turn driven by a worm secured upon the shaft 13, said gear and worm being hidden within the casing 12. The shaft 13 is driven by the gear 14, which is in turn driven by a pinion 15, Fig. 1, upon the shaft 16 of the reversible electric motor M supplied with current from any suitable source through usual starting and switching mechanism, not shown. A horizontal shaft 17 is supported upon the framework in the members 18 and upon this shaft 17 is pivoted a frame comprising the rocking side levers 19 and the tie beams 20. Connecting and movable with the levers 19 is a table or platform 21 upon which is mounted the electric motor $M^1$ which drives through the sprocket chain, belt or other suitable means 22 the horizontal shaft 23 carried by and journaled in the upper ends of the rocking levers 19. Secured upon and driven by the shaft 23 are the vertical saws 24, 24, one less in number than the number of vertical strips into which the ice plate P is to be cut. The saws 24 are spaced at any desired or suitable distances from each other in accordance with the length of the blocks of ice required. Upwardly extending shafts 25, Figs. 1, 2 and 4, are screw threaded at 26 throughout their lower portions and engage in pivoted nuts 27 secured to the plate or table 21. At its upper end each shaft 25 is journaled in a bracket 28, Figs. 2 and 4, which is itself journaled upon the shaft 29 upon which are secured bevel gears 30 meshing with and driving bevel gears 31 secured upon the shafts 25. The horizontal shaft 29 is driven by a bevel gear 32, Fig. 1, which is in turn driven by the bevel gear 32 which is driven by the reversible electric motor $M^2$ supported in any suitable position, as, for example, upon the deck D.

Supported upon suitable floor beams are the rails 41, Figs. 2 and 3, disposed on opposite sides of the plate of ice P and extending parallel thereto. Wheels 42, supporting the carriage 43, roll upon the rails 41 and so provide means for the travel of the table 43 lengthwise of the top of the plate of ice P. Upon the carriage 43 is supported the reversible electric motor $M^3$ which drives the horizontal shaft 44 upon which are secured bevel gears 45 which drive the bevel gears 46 on the upper ends of the vertical shafts 47 on whose lower ends are the bevel gears 48 which in turn mesh with and drive the bevel gears 49 secured to and driving two of the carriage wheels 42. By these means the motor $M^3$ moves the carriage 43 backwardly and forwardly according to direction of rotation of the motor $M^3$ which receives its electric energy from the electric current supply conductors 50 with which engage sliding contacts or trolleys 51 carried by the carriage 43, a controller 52 serving to start and reverse the motor $M^3$.

Upon the carriage 43 are carried the electric motors $M^4$, $M^4$ deriving electric energy through the traveling contacts 51 from the conductors 50, the usual starting boxes, not shown, being provided. These motors have their rotor shafts 53 vertical and at the lower ends of these shafts are secured the horizontal circular saws 54 whose peripheral teeth rotate in close proximity to each other.

On the short horizontal shaft 55 carried by the carriage 43 is secured the member 56 disposed in alinement with the ice plate P.

Upon the shaft 55 is secured a bevel gear 57 which meshes with and drives the bevel gear 58 secured upon and driving the vertical shaft 59 upon whose lower end is secured the gear 60 meshing with and driving the rack 61 movable longitudinally in the guide 62. Coöperating with the outer end 63 of the rack member 61 is the vertical plate 64 hinged or pivoted at 65 to the member 66 supported by the vertical support 67. Extending laterally from the member 66 is the bottom plate 68 whose upper surface is substantially on a level with the horizontal saws 54.

Upon the deck or floor D, Fig. 7, or upon any other suitable support is disposed a standard 69 upon which there is pivoted at 70 the gage bar 71 provided with the rearwardly extending weight 72. At the outer end of the bar 71 there is pivoted at 73 the bell crank lever in whose outwardly extending gage arm 74 is carried a tappet or gage member 75 adjustable as to height by screw threading through the member 74. The gage member or tappet 75 is shown disposed immediately above the plate of ice P in its vertical path of travel. To the other arm 76 of the bell crank lever there is pivoted at 77 the rod 78 pivoted at 79 to the latch 80 which is pivoted at 81 to the bar 71. The latch 80 engages the abutment 82 between which and the under side of the bar 71 is disposed a compression spring 83 tending to throw the bar 71 upwardly. In the member 72 is a slot 84 in which engages a pin 85 on the end of the bar 86 pivoted at 87 to the electric switching mechanism 88 which controls the current supplied to the motor M which elevates the plate of ice P. The tappet or member 75 is so adjusted as to height above the horizontal saws 54 as to correspond with the height or thickness of the blocks of ice to be cut from the plate P.

The operation is as follows:

The plate of ice P having been transferred in vertical position from the freezing tank to the aforementioned apparatus, and resting upon the bottoms 1 and continuing in such vertical position, the motor $M^1$ may first be started and thereby rotate the vertical saws 24. Then the motor $M^2$ is started in such direction that through the gearing driven thereby it will cause the shafts 25 to rotate in such direction as to raise and tilt the frame or table 21 in a counter-clockwise direction, Fig. 2, about the shaft 17, thereby moving the now rotating saws 24 toward the left, Fig. 2, which now cut into and across the top of the plate P. When the saws 24 have been moved toward the left sufficiently to insure cutting entirely through the plate P, the motor $M^2$ is stopped and the saws 24 remain in their forwardly tilted position.

Then the motor M may be started and through the gearing previously described cause the chains 5 to pull upwardly upon the lower wheels 4 and so raise the frame comprising the bottoms 1 upon which the plate P rests, thereby elevating the plate P against the rotating vertical saws 24 which thereby saw vertically downwardly into the plate P. The plate P continues to be elevated as described until its upper edge or face engages the gage member 75, whereupon the bell crank lever 74, 76 will be rotated about its pivot 73, Fig. 7, and the rod 78 will disengage the latch 80 from the abutment 82 whereupon the spring 83 will thrust the arm or bar 71 upwardly and due to the weight 72 the bar will take the position indicated by dotted lines. In so moving, the rod 86 is moved toward the left and the switch 88 opened, and in consequence the ice plate elevating motor M is stopped. The plate P now extends to such height above the plane of the horizontal saws 54 as to correspond with the thickness of the ice blocks to be cut.

At this stage we have the plate P extending the desired distance above the level of the horizontal saws 54 and there are vertical saw cuts therein at distances apart corresponding to the lengths of the ice blocks desired.

Now the operator upon the carriage 43 starts the motors $M^4$, $M^4$, which rotate the horizontal saws 54. Then he starts the motor $M^3$ which, through the gearing heretofore described, causes the carriage 43 to move forwardly upon the rails 41 and carry the rotating saws 54 against a vertical edge of the plate P and to saw into the same and thereby sever the ice blocks in succession from the top of the plate P.

As each block, as B, Fig. 3, is so finally severed by the horizontal saws 54, the continued progress of the carriage 43 across or above the same causes such block eventually to engage the member 56 and thereby rotate the shaft 55 through a partial turn or revolution, with the result that the gear 57 rotates the gear 58 through a greater part of a revolution, due to the ratio of these gears, and the gear 60 actuates the rack 61 and moves the same toward the left, Fig. 3, and causes its end 63 to engage and swing toward the left the plate or member 64 which then kicks or thrusts the block B on to and across the downwardly inclined surface or plate 89, Figs. 2 and 3, and delivers the same on to the traveling conveyer 90 which moves in the direction of the arrow, Fig. 3, the movement of the carriage 43 being preferably in the opposite direction. The conveyer then carries the block B away to storage or to the delivery platform of the ice plant.

And so successive blocks B are cut from the top of a plate P. When the last block of a row has been sawed off, the carriage 43 is returned, by reversing the motor $M^3$, to its normal or original position indicated in Fig. 1, and the motor $M^3$ stopped.

Then the plate elevating motor M is again started in the same direction as before, and the arm 71 having been restored to position indicated in Fig. 7, the plate P is again elevated a distance corresponding with the width of the blocks to be cut, and in so doing the vertical saws 24 cut vertical slits in the plate P. Then the carriage 43 is again caused to traverse the plate P and cut off a second row of blocks which are kicked off by the member 63 on to the conveyer 90 as above described.

This operation is continued until there remain on the bottoms 1 only the bottom or last row of blocks which upon the final elevation of the frame by motor M are delivered on the conveyer 90.

Thereafter the motor M may be started in the opposite direction and the frame comprising the false bottoms 1 is returned to position indicated in Fig. 1 in preparation for reception of the next plate of ice P. The motor $M^2$ is started in the opposite direction and the platform 21 tilted backwardly to restore the vertical saws 24 and their driving motor $M^1$ to normal position.

From the foregoing description it is seen that the plate of ice P, which ordinarily weighs seven tons, is 1 foot thick, 13 feet high and 18 feet wide, is retained in its original vertical position as it is formed or frozen, and while continuing in such position is transferred to the sawing or cutting apparatus and continued in vertical position, while throughout the following process of sawing or cutting which consists in first making vertical cuts in the plate P for a short distance, then making a transverse cut to sever the first row of blocks, then cutting another predetermined distance vertically into the plate P, then horizontally cutting the same to sever the second row of blocks, and so on until the entire plate has been cut up into suitably sized blocks.

By this procedure the breakage or fracture of the ice plate is practically *nil*, and is greatly less than in the cases where the plate is either tilted over into a horizontal position and then cut up or sawed from top edge to bottom edge into vertical strips which are then laid over to horizontal position and then sawed into shorter pieces.

What I claim is:

1. Ice cutting apparatus comprising a carriage movable with respect to a mass of ice, a saw carried by said carriage for sawing said ice, a member carried by said carriage and actuated by the ice, and means actuated by said member for displacing a block of ice when severed.

2. Ice cutting apparatus comprising a carriage movable with respect to a mass of ice, a saw carried by said carriage for sawing the ice, a member carried by said carriage and engaged by the ice due to movement of said carriage with respect to said ice, and a member hinged upon said carriage and actuated by said first named member to displace a block of ice when severed.

3. Ice cutting apparatus comprising a carriage movable with respect to a mass of ice, a saw carried by said carriage for sawing the ice, a conveyer disposed beside the ice and movable in a direction parallel to the direction of movement of said carriage, a member on said carriage engaged and actuated by the ice, and a member actuated by said first named member for displacing a severed block of ice transversely with respect to the direction of movement of said carriage toward said conveyer.

4. Ice cutting apparatus comprising a carriage movable with respect to a mass of ice, a saw carried by said carriage for sawing the ice, a conveyer disposed beside the ice and movable in a direction parallel to the direction of movement of said carriage, a member on said carriage engaged and actuated by the ice, a member actuated by said first named member for displacing a severed block of ice transversely with respect to the direction of movement of said carriage toward said conveyer, and a surface between said conveyer and the ice inclined toward said conveyer.

5. Ice cutting apparatus comprising means for supporting an ice plate in vertical position, a vertical saw, means for elevating said ice plate with respect to said saw whereby said plate is sawed vertically, a horizontal saw, and means for moving said horizontal saw horizontally with respect to said plate.

6. Ice cutting apparatus comprising means for supporting an ice plate in vertical position, a vertical saw, means for elevating said ice plate with respect to said saw whereby said plate is sawed vertically, means limiting the elevation of said plate to an amount less than the height of said plate, a carriage movable horizontally across said plate, and a horizontal saw carried by said carriage, whereby said plate is severed into blocks.

7. In ice cutting apparatus, a movable carriage, an ice cutter carried thereby, means carried by said carriage and actuated by severed ice, and means actuated by said means for delivering the severed ice in a direction transverse to the direction of movement of said carriage.

8. Ice cutting apparatus comprising means for supporting an ice plate in vertical position, a vertical cutter, means for causing upward movement of said ice plate with respect to said cutter whereby said plate is cut vertically, a gage determining the vertical movement of said plate with respect to said cutter, means controlled by said gage controlling said second named means, and a saw movable horizontally to sever ice blocks whose height has been predetermined by said gage.

In testimony whereof I have hereunto affixed my signature this 6 day of July, 1916.

GEORGE L. REUSCHLINE.